(12) United States Patent
Kageyama et al.

(10) Patent No.: US 7,400,461 B2
(45) Date of Patent: Jul. 15, 2008

(54) LENS HOLDER AND LENS UNIT

(75) Inventors: Takuya Kageyama, Suwa (JP); Takashi Yamaguchi, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 0 days.

(21) Appl. No.: 11/239,562

(22) Filed: Sep. 28, 2005

(65) Prior Publication Data

US 2006/0072218 A1 Apr. 6, 2006

(30) Foreign Application Priority Data

Sep. 29, 2004 (JP) ............... 2004-283569
Sep. 30, 2004 (JP) ............... 2004-286989

(51) Int. Cl.
*G02B 27/10* (2006.01)
*G02B 7/02* (2006.01)

(52) U.S. Cl. ............... 359/819; 359/811; 359/813; 359/622; 359/618

(58) Field of Classification Search ............... 359/819, 359/811, 813, 822, 823, 619–626, 633–636
See application file for complete search history.

(56) References Cited

U.S. PATENT DOCUMENTS 6,829,111 B2 * 12/2004 Fujisawa et al. ............ 359/822
2006/0061888 A1 3/2006 Kageyama et al.

FOREIGN PATENT DOCUMENTS

| JP | 06-138386 | | 5/1994 |
| JP | 2001-042211 | | 2/2001 |
| JP | 2001-166380 | | 6/2001 |
| JP | 02001166380 | * | 6/2001 |
| JP | 2001-222060 | | 8/2001 |
| JP | 2002-040308 | | 2/2002 |
| JP | 2002-107663 | | 4/2002 |

* cited by examiner

*Primary Examiner*—David N. Spector
*Assistant Examiner*—Brandi N Thomas
(74) *Attorney, Agent, or Firm*—Thompson Hine LLP

(57) ABSTRACT

A lens holder for holding a plurality of lenses is provided. The lens holder is assembled from a plurality of subunits divided on a plane that is parallel to an optical axis. A subunit includes a substantially cylindrical outer shell and front side rear side portions that extend from an inner surface of the outer shell toward the optical axis to support at least one lens from in front and behind respectively. When the at least one lens is attached between the portions, one of the portions is harder to deform than the other of portions.

10 Claims, 6 Drawing Sheets

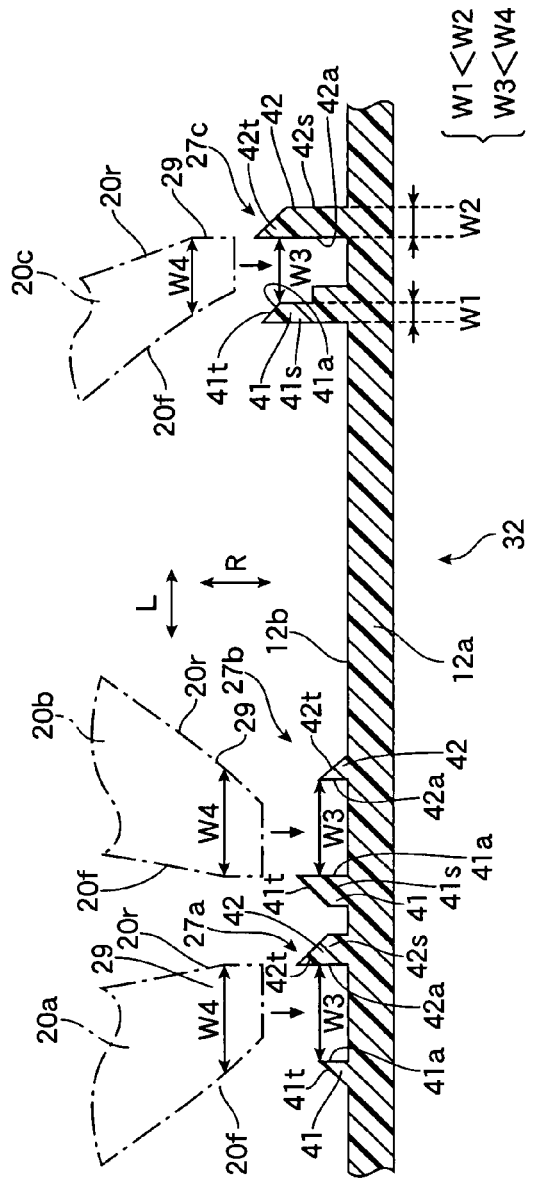
Fig. 6A
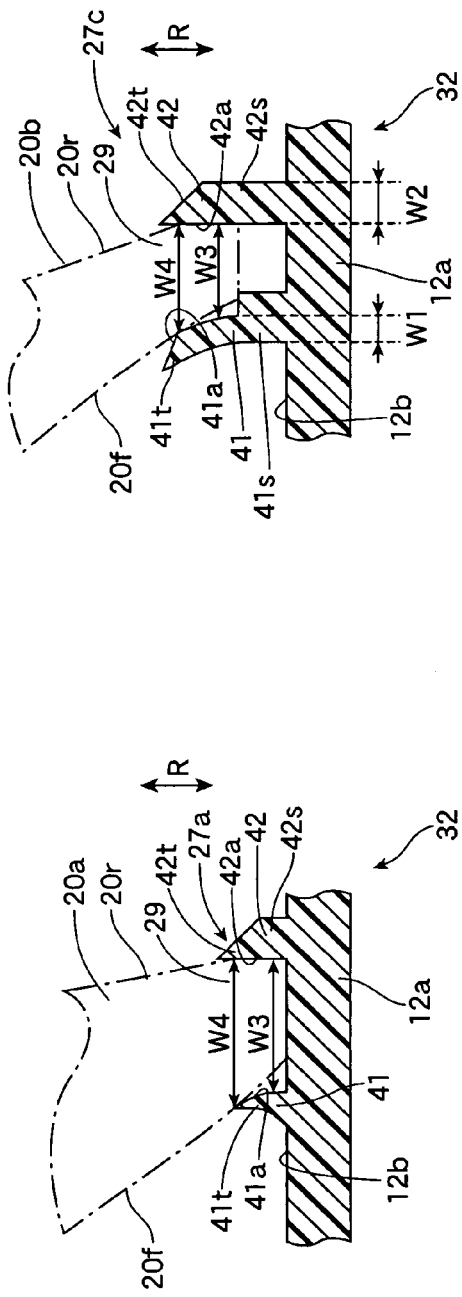
Fig. 6B
Fig. 6C

LENS HOLDER AND LENS UNIT

CROSS-REFERENCE TO RELATED APPLICATIONS

This application is based upon and claims the benefit of priority from the prior Japanese Patent Applications No. 2004-283569, filed Sep. 29, 2004, and No. 2004-286989, filed Sep. 30, 2004, the entire contents of both of which are incorporated herein by reference.

BACKGROUND

The present invention relates to a holder for a lens system that is suited to an image displaying apparatus that magnifies and projects, onto a screen, an image from an image generating apparatus (for example, a light modulator such as a liquid crystal display device, a DMD, or the like), to a lens unit comprising such lens system, and to an image displaying apparatus comprising such lens unit.

A lens unit used in apparatus (for example, a camera, projector, or the like) is produced by holding a plurality of lenses in a cylindrical holder or lens holding unit, and is incorporated in the apparatus. Japanese Laid-Open Patent Publication No. 2002-40308 discloses an apparatus where contact surfaces are formed interior of cylindrical lens holding members, lenses are inserted into the lens holding members and the lenses are fixed using pressing rings in a state where the edges of the lenses contact the contact surfaces respectively. According to this construction, a plurality of lenses are assembled in one unit in a state where the distances between the lenses in the direction of the optical axis are fixedly adjusted.

When constructing an optical system (lens unit) from a plurality of lenses, tolerances for the thicknesses of the lenses affect the image forming performance and aberration correction. The effect on the performance of the lens unit is unequal for the front and rear (i.e., front and rear surfaces) of each lens included in the lens unit. Due to factors such as a difference in curvature between the front and rear surfaces of a lens and/or the relationship with adjacent lenses or lens groups, there is a difference between the effect of the tolerance for one surface of a lens and the effect of the tolerance for the other surface of the lens.

In the lens apparatus disclosed by Japanese Laid-Open Patent Publication No. 2002-40308, the positions of the one side of the lens surfaces that contacts the contact surface of a lens holding member is precisely determined. If the lenses had different diameters and were inserted into the lens holding member by a favorable order, for all of the lenses, the front or rear surface of each lens that has a large effect is placed in contact with the contact surface of the lens holding member to control the position of such surface.

However, for the lens apparatus that includes lenses of a similar diameter, it is difficult for precisely maintaining the distance between the facing surfaces of such lenses. When holding a plurality of lenses of a similar diameter, even if the order in which the lenses are inserted into the lens holding member is adjusted, it becomes difficult to support face to face surfaces that have a large effect using the contact surfaces.

There are known projectors that generate an image by modulating light from a light source using a light modulator (for example, light valve) such as a liquid crystal display or a DMD and magnify and project the image onto a screen using a lens unit. Rear projectors are one example of such projectors. Rear projectors project images from behind the screen, and show promise as slim image displaying apparatuses that display sharp images on a large screen. In a projector disclosed by Japanese Laid-Open Patent Publication No. 2001-222060, a projection unit that includes a projection lens and its incident side is fixed, using a supporting means, in a cantilever state to an optical unit that includes a light source and a liquid crystal display unit.

In a "front-type" projector where the screen is separated from the projector main unit and images are projecting onto the screen from the front, the position of some of the lenses in the lens unit, normally the lens closest to the screen, can be slightly adjusted to focus the image projecting onto the screen and produce a sharp image.

In a rear projector where images are projecting from behind the screen, the lens unit is housed inside a housing of the rear projector. Therefore, it is difficult for the user to make focus adjustments. So, projectors are shipped after the focus has been adjusted.

In a rear projector, the lens unit is housed in the housing together with the light source that becomes a source of heat. Therefore the temperature of the lens unit is susceptible to rising. Accordingly, for the lens unit of a rear projector, to attain sharper images and fairer optical performance such as focusing, more precise setting of the lens positions and less fluctuate to temperature fluctuations are required.

SUMMARY

One of aspects of the present invention is a lens holder that holds a lens system including a plurality of lenses, and includes a plurality of subunits that assemble at least part of the lens holder and are divided on a plane parallel to an optical axis of the plurality of lenses. A subunit of the plurality of subunits includes a part of substantially cylindrical outer shell and front side and rear side portions that extend from an inner surface of the outer shell toward the optical axis to support at least one lens from in front and behind respectively. When the at least one lens is attached between the portions, one of the portions is harder to deform than other portions.

Since the subunits are parts that are divided on a plane parallel to the optical axis, it is possible to set a lens, "a lens" may also include a pair of cemented lenses and the like, from a direction that is perpendicular to the optical axis, and a lens can be attached between the predetermined front side and rear side portions irrespective of the front-rear arrangement and the sizes of the lenses to be held in the holder. The subunits are formed so that the front or rear surface of each lenses that has the larger effect is supported by the one of the portion that does not deform or deforms less easily. Therefore, by assembling the lens unit from the plurality of subunit and holding the lenses therein, a lens system can be provided where the larger effective surfaces of the each lenses are set at desired positions.

When a lens is held by the portions, rattling of the lens is also prevented by the other portions that does deform or deforms more easily and the edge of the lens fits between the portions.

Another aspect of the present invention is a lens unit where a lens system is held by the above lens holder. Yet another aspect of the present invention is an image displaying apparatus including a lens unit, a screen, and an image generating apparatus that forms an image to be projected via the lens unit onto the screen.

Here, one of the front side and rear side portions being hard to deform than the other when the lens being inserted between the portions means that the other of the front side and rear side portions deforms easily. Accordingly, it is preferable that the distance between the portions is formed narrower than the thickness of the part of the at least one lens that contacts or engages with the front side and the rear side portions, and the other of the portions deforms so as to engage with the at least one lens.

The portions that have different thickness are one of examples where the one of the portions is harder to deform and the other of the portions is easier to deform. Changing the thickness of the base parts of the front side and rear side portions, changing the cross-sectional area, and providing reinforcing members and reinforcing forms such as ribs are all effective in making the other of the portions more flexible than the one of the portions when the same material is used for the portions. It is also possible to change the material of the front side rear side portions. The material including plastic, resin, and so on is favorable to making the portion and other part of the subunit. The front side and rear side portions may mold with the subunit as a unit.

The portions that have the different cross-sectional form are also effective. When a surface of a lens with the smaller effect is convex and highly curved, by receiving the surface with a portion whose tip narrows like a taper, the surface of the lens can be supported flexibly. When the portions are almost the same shape, one of the portions that contacts the low curvature surface of a lens is harder to deform.

With a construction where one of the front side and rear side portions is harder to deform and the other is easier to deform, the positions of the surfaces of the lenses with the larger effect are fixed and the positions of the surfaces of the lenses with the smaller effect are supported with a certain degree of flexibility. Accordingly, when the coefficients of thermal expansion differ between the subunits and lenses, such difference can be absorbed by such flexible construction. This means that even if the temperature of the periphery in which the lens unit is installed changes, it is possible to suppress warping of the lenses due to stress from the subunits caused by the change in temperature, and it is possible to easily achieve stable optical performance with respect to changes in temperature.

When the subunits are manufactured using a material such as plastic and resin with a higher coefficient of thermal expansion than the lenses, there is a tendency for the inner diameter to expand when the temperature rises due to the heat of the light source during use of the lens unit. For this reason, even if the temperature rises, no increase in stress on the lenses from the lens holder is expected. A type where the edge of a lens is held by a construction where one the portions deforms easily and the other does not deform easily can prevent a drop in the holding force even if the inner diameter of the subunits expands somewhat. Accordingly, when a lens is attached to this type of subunits, it is not necessary to press the lens with excessive force, and therefore deterioration in the optical performance of the lens unit due to the pressing force used during attachment can be avoided.

One aspect of the subunits is "clamshell-type units" for assembling a clamshell that is divided in two subunits on a plane including the optical axis. Clamshell-type subunits can be manufactured using the same mold. For this reason, the lens holder (says in other words "a lens holding unit") can be manufactured at even lower cost.

Since lenses are held by the two subunits of the same shape by being inserted from a direction perpendicular to the optical axis, the manufacturing tolerances of the subunits are symmetrical with respect to the optical axis and the effects thereof are dissipated. Accordingly, there is the merit that manufacturing tolerances of the subunits are unlikely to cause a drop in the optical performance of a lens unit that uses the subunits.

When the lens system is for projecting light from an image generating apparatus onto a screen, the lens holder should preferably include a support structure (a support construction) that supports the weight of the lens unit including the lens holder and the lens system at a position away from the image generating apparatus. The image generating apparatus includes a light source that becomes a source of heat or is positioned close to such light source. By independently supporting the weight of the lens unit from a position away from the image generating apparatus, the effect of heat on the position that becomes the origin for thermal expansion/contraction can be suppressed. Accordingly, when the lens unit may expand due to heat, the relative displacement of the lenses with respect to the screen can be reduced and fluctuation in the focal point due to changes in temperature can be suppressed.

If the lens unit is supported by the image generating apparatus and is fixed so that the positional relationship between the light valve as the light modulator and the screen does not change, the respective lenses held by the lens holder will move toward the screen as the lens holder expands due to a rise in temperature. This causes lenses at a position away from the light valve, that is, at a position close to the screen that greatly affects the focusing to move significantly, resulting in a drop in the focusing performance and in the image quality on the screen. On the other hand, if a holder is fixed by some method type that prevents the respective lenses from moving, the internal stress of the lens holder due to a rise in temperature accumulates and the effects of such stress cause the lenses to warp. So, such a fixing method where the lenses do not move at all can conversely lower the aberration correcting performance of the lens unit and lower image quality.

By supporting the lens unit at a position away from the image generating apparatus, it is possible to provide a lens holder where lenses close to the screen do not significantly move due to thermal expansion and the respective lenses move in a balance manner. It is also effective to support part or all of the image generating apparatus, such as a light valve, using the incident side of the lens holder. It is possible to have the distance between an image generating apparatus, such as a light valve, and a lens system fluctuate due to thermal expansion in a suitably balanced manner.

Supporting the screen side of the lens unit by a support structure reduces movement of the lenses on the screen side due to thermal expansion. Supporting the lens unit at or the near the center of gravity of the lens unit makes possible to support the lens unit at the center or near the center in the longitudinal direction. The center supporting prevents the lens holder from being cantilevered and to suppress the occurrence of internal stress caused thereby.

A lens unit for a rear projector uses a lens system where the optical path is bent inside the lens holder. With this type of lens unit, when the lenses move due to thermal expansion of the lens holder, there is the risk of not only the focal point moving but also the image being shifted on the screen. Accordingly, the type of supporting the lens holder at a position away from the image generating apparatus can also easily prevent shifting of the image.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6A is a cross-sectional view showing a construction for holding lenses in a subunit;

FIG. 6B is an enlarged view of a part of FIG. 6A; and

FIG. 6C is an enlarged view of another part of FIG. 6A.

DETAILED DESCRIPTION

Figure 1:
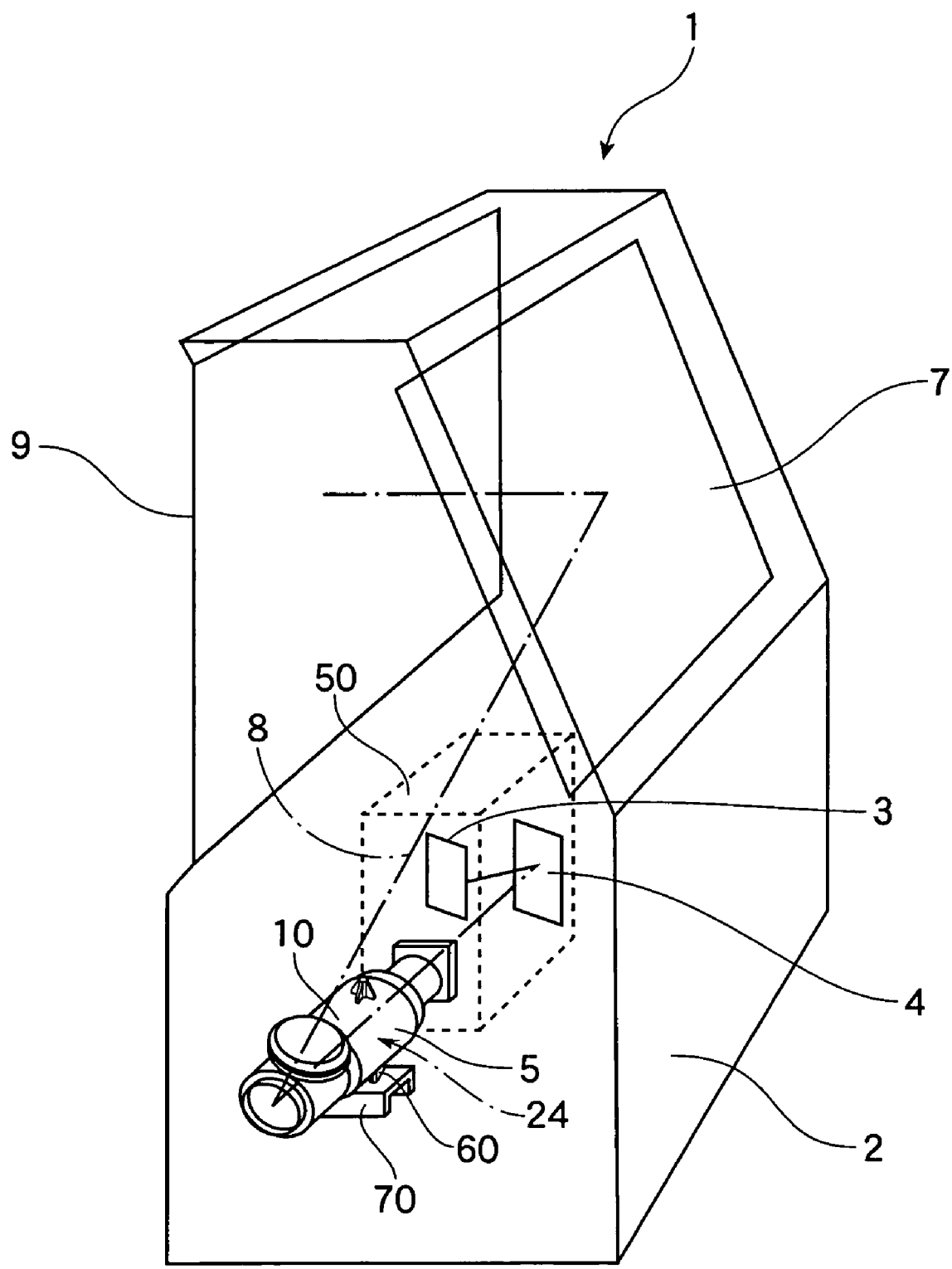
FIG. 1 is a perspective view showing the overall construction of a rear projector.

FIG. 1 schematically shows a rear projector 1. The rear projector 1 includes, inside a housing 2, an image generating apparatus 50 for generating projecting light 8, and a lens unit 5 for magnifying and projecting the projecting light 8 onto a screen 9. The image generating apparatus 50 includes a light source 3 and a light modulator (light valve) 4 for modulating light from the light source 3 according to an image signal to produce the projecting light 8. The lens unit 5 includes a lens system 24 including a plurality of lenses for magnifying and projecting an image formed by the light valve 4 onto a screen and a lens holder 10 for housing the lens system 24. Inside the lens holder 10, the optical path is bent by 90° (90 degrees) so that the projecting light 8 that has been outputted from the image generating apparatus 50 in the width direction of the rear projector 1 is converted and outputted as light in the front-rear direction of the rear projector 1. On the rear projector 1, the screen 9 is disposed at the front of the housing 2 and the projecting light 8 outputted from the lens unit 5 is reflected by a mirror 7 positioned at the rear so that an image on the light valve 4 is magnified and projected from the rear surface of the screen 9. A liquid crystal display panel, a DMD panel composed of micromirror elements, or the like is used as the light valve 4.

The lens unit 5 is an independent unit that can be separated from the image generating apparatus 50. The lens holder 10 includes a post-like support 60 that protrudes from the lens holder 10 in substantially the center in the longitudinal direction of the lens holder 10. The support 60 is attached to a support platform 70 attached to a base surface of the housing 2, and can support the lens unit 5 in an independent state from the housing 2.

Figure 2:
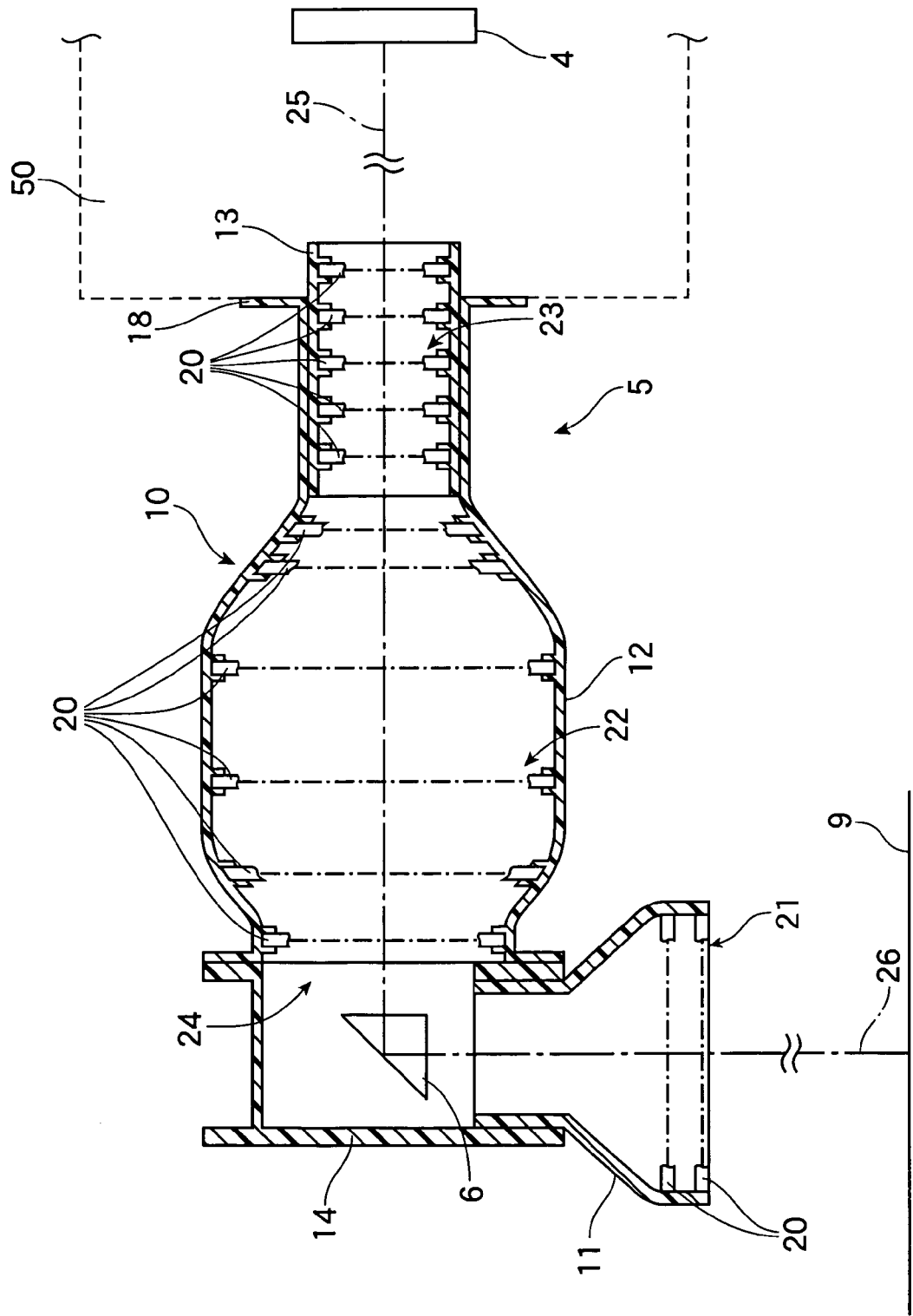
FIG. 2 is a cross-sectional view showing the overall construction of a lens unit.

FIG. 2 schematically shows the construction of the lens unit 5. The lens unit 5 includes a plurality of lenses 20, a prism 6 for bending the optical path inside the lens unit 5, and the lens holder 10 that houses the lens system 24 composed of the lenses 20 and the prism 6. The overall form of the lens holder 10 is L-shaped. Light is bent by 90° inside the lens unit 5 by the enclosed prism 6 and is outputted as projecting light. This projecting light is projected via the mirror 7 of the rear projector 1 onto the screen 9 to form an image. The plurality of lenses 20 is divided into a first lens group 21, a second lens group 22, and a third lens group 23 disposed in that order from the side of the screen 9. The first lens group 21 is disposed on the screen 9 side of the prism 6, while the second lens group 22 and the third lens group 23 are disposed on the light valve 4 side of the prism 6.

The lens holder 10 includes a cylindrical first shell 11 that houses and holds the lenses of the first lens group 21, a cylindrical second shell 12 that houses and holds the lenses of the second lens group 22, a cylindrical third shell 13 that houses and holds the lenses of the third lens group 23, and a fourth shell 14 for connection purposes that holds the prism 6 and bends the optical path by 90°. By the second shell 12 and the third shell 13 respectively, the second lens group 22 and the third lens group 23 are disposed along an optical axis 25 that is aligned with the light valve 4. The fourth shell 14 connects the first shell 11 to the second shell 12 in a perpendicular direction. By the first shell 11, the first lens group 21 is disposed along the optical axis 26 that is aligned with the screen 9 via the mirror 7.

Figure 3:
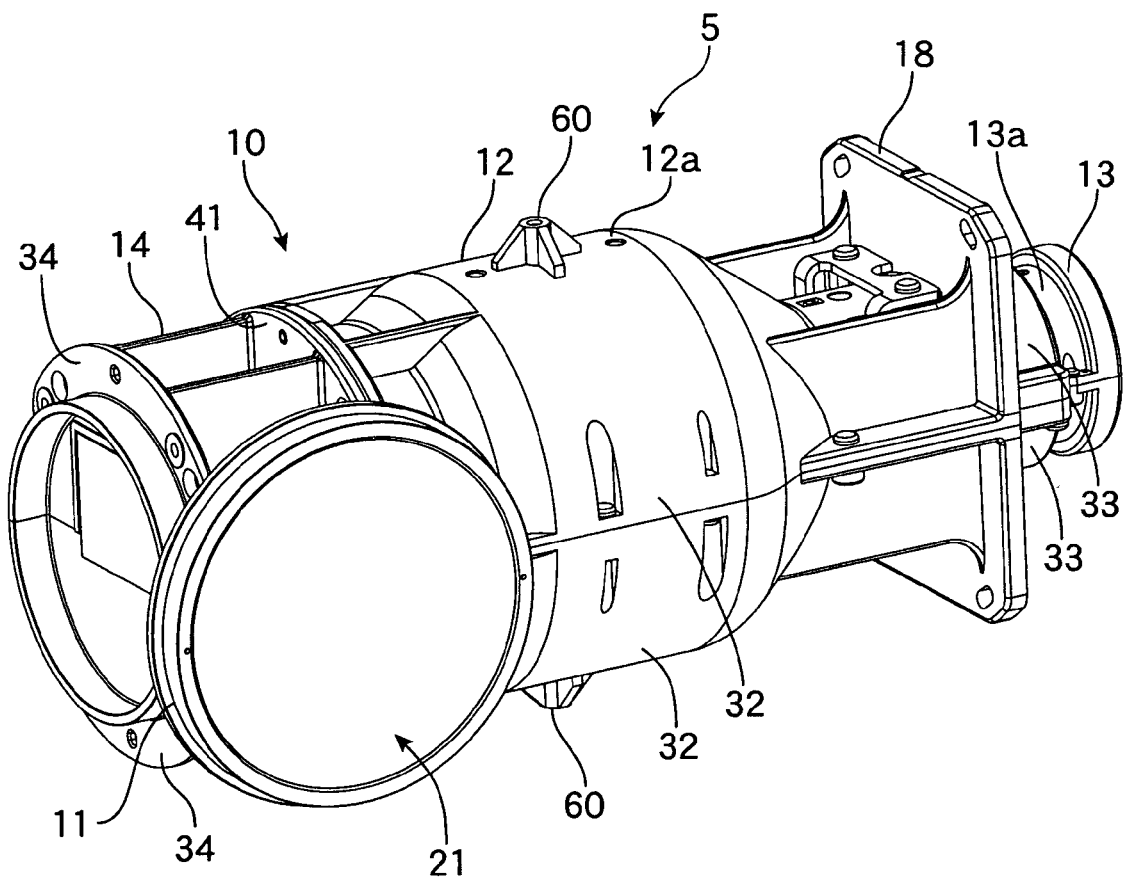
FIG. 3 is a perspective view showing the outside of the lens unit shown in FIG. 2 in state where respective shells of the lens unit are connected.
Figure 4:
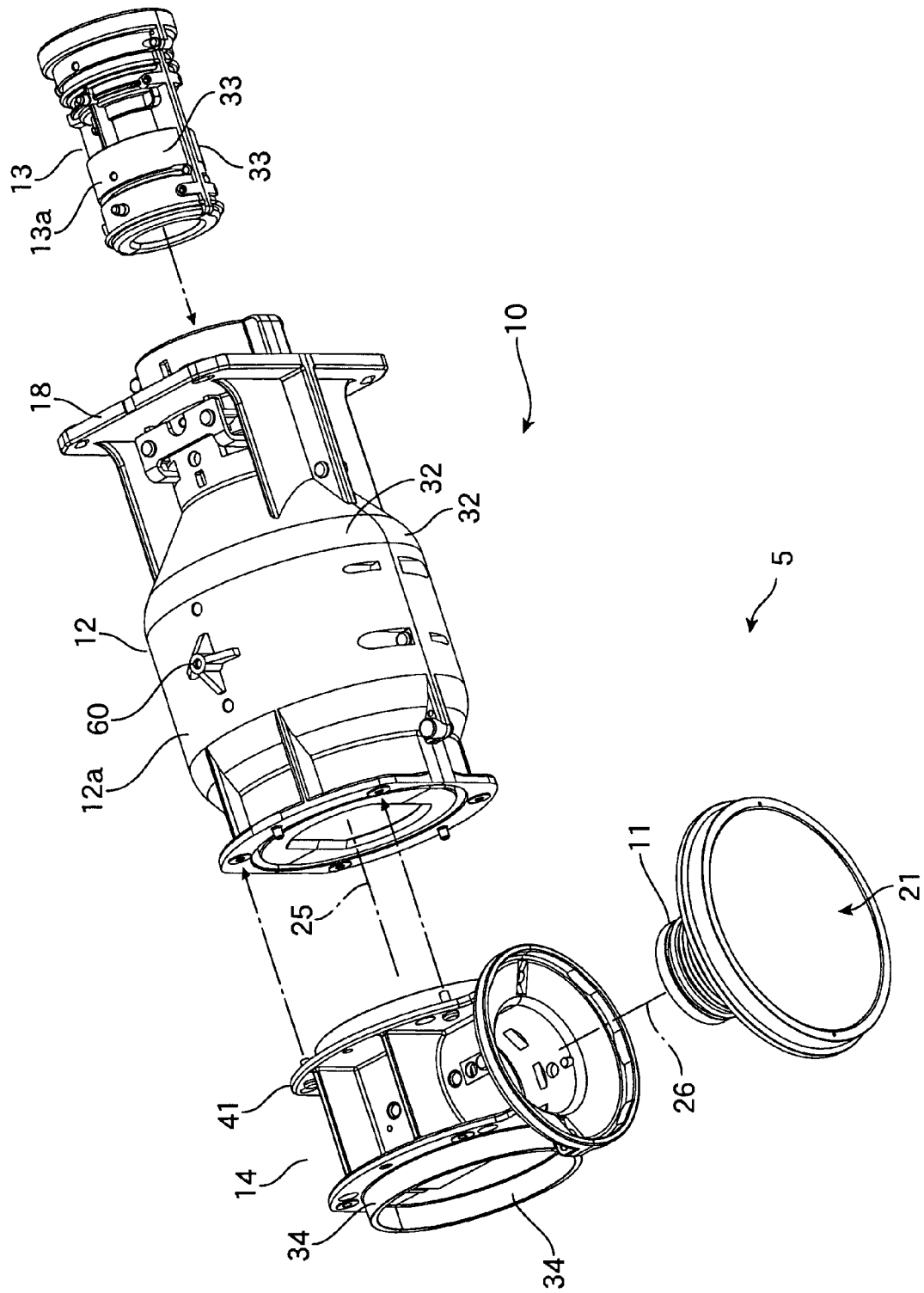
FIG. 4 is a perspective view showing outside of the lens unit shown in FIG. 2 in state where the respective shells are separated.

FIG. 3 is a perspective view showing the external appearance of the lens unit 5. FIG. 4 is a perspective view of the lens holder 10 in a state where the respective shells have been separated. The second shell 12, the third shell 13, and the fourth shell 14 are respectively clamshells and a clamshell is constructed of subunits (clamshell type subunits) of the same shape produced by dividing the shells in two in an up-down (or left-right) direction on a plane including the optical axis 25. The subunits are joined together by a method such as screws to form shells that are substantially cylindrical. That is, the second shell 12 includes two subunits 32 of the same shape, the third shell 13 includes two subunits 33 of the same shape, and the fourth shell 14 includes two subunits 34 of the same shape.

Since the first shell 11 is disposed so that the first lens group 21 can be easily inserted from one end of the first shell 11, a clamshell-type construction is not used. However, in the same way as the other shells, the first shell 11 may be a clamshell by dividing the first shell 11 on a plane including the optical axis 26.

Figure 5:
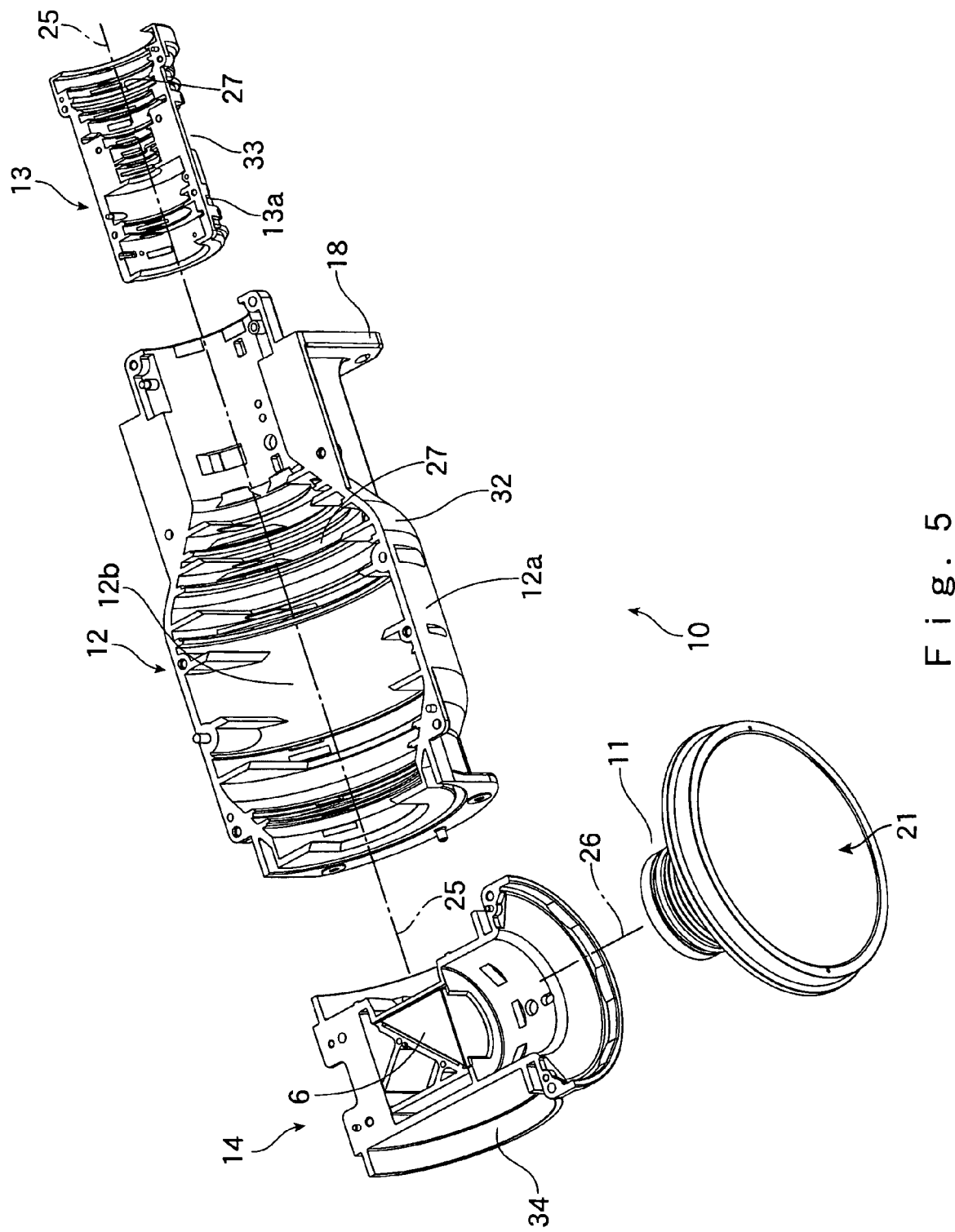
FIG. 5 is a perspective view showing subunits (clamshell-type units) that construct the respective shells of the lens holder.

FIG. 5 is a perspective view showing the second subunit 32 that constructs the second shell 12, the third subunit 33 that constructs the third shell 13, and the fourth subunit 34 that constructs the fourth shell 14.

The second shell 12 has an overall cylindrical shape and is assembled from the second subunits 32 produced by halving (i.e., dividing into two) the second shell 12 on a plane including the optical axis 25. The subunits 32 each include an outer shell 12a that is a part of the outer of the shell 12 and shaped as a half cylinder and, on an inside thereof, a construction 27 for holding the respective lenses 20 included in the second lens group 22 from the radial direction of the lenses 20.

The third shell 13 has an overall cylindrical shape and is assembled from the third subunits 33 produced by halving (i.e., dividing into two) the second shell 13 on a plane including the optical axis 25. The subunits 33 each include an outer shell 13a that is a part of the outer of the shell 13 and shaped as a half cylinder and, on an inside thereof, a construction 27 for holding the respective lenses 20 included in the third lens group 23 from the radial direction of the lenses 20.

FIG. 6A is an enlarged cross-sectional view showing the construction 27 that is provided for holding lenses in the subunits 32. In FIG. 6A, for example, constructions 27a, 27b, and 27c that respectively hold the three lenses 20a, 20b, and 20c are shown. The respective lens holding constructions 27a to 27c include front side and rear side portions 41 and 42 that hold lenses respectively from the front and rear in the direction L along with the optical axis 25 (i.e., the left and right sides in FIG. 6A). The front side and rear side portions 41 and 42 of the respective holding constructions 27*a* to 27*c* are formed so that when the lenses 20*a* to 20*c* have been inserted into the respective holding constructions 27*a* to 27*c*, one of the front side and rear side portions 41 and 42 is harder to deform than the other of the front side and rear side portions 41 and 42. Accordingly, the other of the portions 41 and 42 deforms more easily than the one of the portions 41 and 42.

The leftmost lens holding construction 27*a* in FIG. 6A is constructed so that the front side portion 41 is easier to deform than the rear side portion 42, or in other words, the rear side portion 42 is harder to deform than the front side portion 41. The middle lens holding construction 27*b* is constructed so that the front side portion 41 deforms less easily than the rear side portion 42, or in other words, the rear side portion 42 deforms more easily than the front side portion 41. The rightmost lens holding construction 27*c* is constructed so that the front side portion 41 is easier to deform than the rear side portion 42, or in other words, the rear side portion 42 is harder to deform than the front side portion 41.

Although the functions of the portions 41 and 42 are reversed, the lens holding constructions 27*a* and 27*b* have fundamentally the same construction. As shown by the enlargement in FIG. 6B, in the lens holding construction 27*a*, the front side portion 41 and the rear side portion 42 are convex portions that protrude in the radial direction R from the inner surface 12*b* of the outer shell 12*a* toward the optical axis 25 in the center, and are formed so as to be continuous around the inner surface 12*b* in the circumference direction.

The front side portion 41 and the rear side portion 42 form a concave region that sandwiches an edge part 29*a* of the lens 20*a* from the front and rear and engages with the lens 20*a*. The rear side portion 42 includes a base part 42*s* that is quadrangular in cross-section and a tip part 42*t* that is triangular in cross-section. A side 42*a* of the tip part 42*t* that contacts the lens 20*a* is a flat surface, and the opposite side is an inclined surface. The front side portion 41 is constructed of a tip part 41*t* that is triangular in cross-section, with the side 41*a* that contacts the lens 20*a* being a flat surface and the opposite side being an inclined surface. The distance (width) W3 between the front side portion 41 and the rear side portion 42 is set narrower than the length (thickness) W4 of a part 29 of the lens 20*a* that contacts the front side portion 41 and the rear side portion 42. When the lens 20*a* is inserted between the front side portion 41 and the rear side portion 42, the front surface 20*f* of the lens 20*a* contacts the front side portion 41 and the rear surface 20*r* reliably contacts the rear side portion 42.

For the optical performance of the lens unit 5, the effect of the rear surface 20*r* of the lens 20*a* is larger than the effect of the front surface 20*f*. For this reason, the position of the rear surface 20*r* should preferably be set more precisely than the position of the front surface 20*f*. Therefore, in the lens holding construction 27*a*, by comparing the cross-sectional area of the respective portions 41 and 42 that contact the lens 20*a* in front surface 20*f* and rear surface 20*r* respectively, the cross-sectional area of the front side portion 41 is smaller than that of the rear side portion 42. Accordingly, the rear side portion 42 is hard to deform than the front side portion 41, or in other words, the front side portion 41 deforms more easily than the rear side portion 42.

In the lens holding construction 27*a*, also, the curved surface of the front surface 20*f* of the lens 20*a* that has relatively little effect is highly curved. The lens 20*a* is in substantially point contact (contact along a line) with the front side portion 41. On the other hand, the rear surface 20*r* of the lens 20*a* that has the larger effect, the area that contacts the rear side portion 42 is substantially flat and therefore the lens 20*a* is in planar contact with the rear side portion 42. Accordingly, due to the relationship with the form of the lens 20*a* also, the front side portion 41 can deform more easily than the rear side portion 42. For these reasons, when the lens 20*a* is inserted between the front side portion 41 and the rear side portion 42 of the holding construction 27*a*, the edge part 29 of the lens 20*a* engages with the portions 41 and 42 and being set on the inside of the shell 12 with its position automatically or autonomously determined by referring the surface 42*a* of the rear side portion 42 as the base. That is, the lens 20*a* is held in a state where the positional precision of the rear surface 20*r* of the lens 20*a* that contacts the surface 42*a* of the rear side portion 42 is high.

For the lens holding construction 27*b* where the constructions of the front side portion 41 and the rear side portion 42 are reversed, when the lens 20*b* is inserted between the front side portion 41 and the rear side portion 42, the set position of the lens 20*b* is automatically or autonomously determined with the surface 41*a* of the front side portion 41 as a reference. As a result, the lens 20*b* is held in a state where the positional precision of the front surface 20*f* of the lens 20*b* that contacts the surface 41*a* of the front side portion 41 is high.

As shown by the enlargement in FIG. 6C, the front side portion 41 and the rear side portion 42 of the lens holding construction 27*c* are convex parts that protrude in the radial direction R from the inner surface 12*b* of the outer shell 12*a* toward the optical axis 25 in the center of the shell 12. The front side portion 41 and the rear side portion 42 are formed continuously or intermittently around the inner surface 12*b* of the shell in the circumference direction. Accordingly, the front side portion 41 and the rear side portion 42 form a concave region that sandwiches an edge part 29 of the lens 20*c* from the front and rear.

The rear side portion 42 of the holding construction 27*c* includes a base part 42*s* that is quadrangular in cross-section and a tip part 42*t* that is triangular in cross-section. A side 42*a* of the tip part 42*t* that contacts the lens 20*c* is a flat surface, and the opposite side is an inclined surface.

The front side portion 41 of the holding construction 27*c* includes a base part 41*s* that in cross-section is composed of quadrangular shapes disposed on two levels, and a tip part 41*t* that is triangular in cross-section.

The width (thickness) W1 of the upper section of the base part 41*s* of the front side portion 41 is smaller than the width (thickness) W2 of the base part 42*s* of the rear side portion 42, therefore the upper section of the base part 41*s* of the front side portion 41 is constructed so as to deform more easily than the rear side portion 42.

In addition, a side 41*a* of the tip part 41*t* of the front side portion 41 of the holding construction 27*c* that contacts the lens 20*c* is an inclined surface, and the opposite side is a flat surface. The distance (width) W3 between the upper section of the front side portion 41 and the rear side portion 42 is set narrower than the length (thickness) W4 of a part 29 of the lens 20*c* that engages with the front side portion 41 and the rear side portion 42. When the lens 20*c* is inserted between the front side portion 41 and the rear side portion 42, the front surface 20*f* of the lens 20*c* contacts the upper portion of the front side portion 41 and the rear surface 20*r* reliably contacts the rear side portion 42.

On the optical performance of lens unit 5, the effect of the rear surface 20*r* of the lens 20*c* is higher than the effect of the front surface 20*f*. Since the thickness of the upper section of the front side portion 41 is set narrower than the thickness of the base part 42s of the rear side portion 42, the front side portion 41 deforms more easily than the rear side portion 42 when the lens 20c engages with the portions 41 and 42 of the construction 27c. Accordingly, the set position of the lens 20c is automatically or autonomously determined based on the surface 42a of the rear side portion 42 that is harder to deform. As a result, the lens 20c is held in a state where the positional precision of the rear surface 20r of the lens 20c that contacts the surface 42a of the rear side portion 42 is high.

To determine the positions of the surfaces of the plurality of lenses 20a to 20c with the lens arrangement shown in FIG. 6A is difficult with a holder that uses a method where the lenses are all inserted from either the left or right end since the lenses and the members that support the surfaces of the lenses interfere with one another due to their almost the same diameters. For a holder that uses a method where lenses can be inserted from both left and right ends, the lenses and contact surfaces interfere in the same way, again making assembly difficult.

With the clamshell-type subunits 32 or 33, the lenses 20a to 20c can be attached to the lens holding constructions 27a to 27c from the radial direction R that is perpendicular to the direction L along with the optical axis 25. By the construction described above, among the surfaces of the lens 20a to 20c, it is possible to flexibly arrange the positions of the surfaces that are basic references and should be kept stationary.

In the construction 27a to 27c, at least one side of the portions 41 and 42 is distorted when the lenses 20a to 20c are attached, therefore, in addition to precisely maintaining the desired surface positions, the respective lenses are reliably held without rattling. It is possible to mass produce lens units with high optical performance as designed with a favorable yield. Accordingly, by using the lens unit 5, it is possible to assemble and provide a rear projector 1 that can display sharp images.

When said lens unit 5 is used inside the rear projector 1, the temperature will rise due to the heat of the light source 3. At this time, the portion out of the front side portion 41 and the rear side portion 42 that deforms more easily flexibly deforms so that the difference in the coefficient of thermal expansion in the optical axis direction between the lenses 20 and the lens holder 10 can be absorbed by moving the positional relationship with the surface with the smaller effect. Accordingly, even if the temperature of the periphery in which the lens unit 5 is installed changes, it is possible to suppress warping of the respective lenses 20 due to stress from the subunits or lens holder 10 caused by the change in temperature, and movement of the lens surfaces with the larger effect can be suppressed. For this reason, said lens unit 5 can achieve an extremely stable optical performance even in response to temperature changes.

In consideration to the effects of thermal expansion in the radial direction R, when the lens holder 10 that includes the respective subunits is manufactured from a material with a higher coefficient of thermal expansion than the lenses, for example resin, the inner diameter will increase when the temperature rises during use, which prevents stress from being applied to the lenses 20. Accordingly, the thermal effect on the optical performance is small. On the other hand, the holding force that holds the lenses 20 tends to fall when the inner diameter of the lens holder 10 increases. However, in the lens holder 10 in this description, the edges 29 of the lenses 20 are sandwiched or engaged with and held flexibly by the respective portions 41 and 42. Accordingly, the respective lenses 20 can be reliably held at the desired positions without the holding force falling even if the inner diameter of the lens holder 10 increases somewhat. For this reason, the lens unit 5 can achieve a stable optical performance with respect to changes in temperature.

With the lens unit 5 that uses clamshell-type units, it is easy to align the optical axes of a plurality of lenses and the respective lenses can be held at desired positions. This makes it possible to manufacture lens units with high optical performance with a favorable yield and at low cost. That is, when the lens unit 5 is assembled, in the second shell 12 that holds the second lens group 22, for example, the lenses that construct the second lens group 22 are respectively inserted in one of the subunits 32 and then the other subunit 32 is attached to assemble the second shell 12. This is also the case for the other clamshell-type shells.

After this, the shells 11 to 14 are connected to form the holder 10. Since the clamshell-type subunits of the same shape are manufactured from the same mold, the subunits are economical and the manufacturing tolerances are the same. Accordingly, when clamshell-type units with the same manufacturing tolerances are used, since the lenses are held from a direction that is symmetrical around the optical axis, the tolerances are easy to be cancelled, and the lens groups held by such units can be precisely aligned in a straight line centered on the optical axis.

In the lens holder 10 of the lens unit 5, the second shell 12 includes the support 60 for supporting the weight of the lens unit 5 in substantially the center. Accordingly, the lens unit 5 can support its own weight at a position that is distant from the image generating apparatus 50. A flange construction 18 for connecting to the image generating apparatus 50 is formed at the end to the light valve 4 of the second shell 12. It is possible to design the internal arrangement of appliances in the rear projector 1 so that part of the weight of the lens unit 5 is supported from the image generating apparatus 50 using the flange 18. Conversely, it is possible to design the internal arrangement of appliances in the rear projector 1 so that all or part of the weight of the image generating apparatus 50 is supported via the lens unit 5 using the flange 18. Part of the image generating apparatus 50, for example, the light valve 4 can be designed so as to be supported from the lens unit 5.

The center of the second shell 12 on which the support 60 is disposed is at substantially the center of the lens holder 10, that is, the center of the lens unit 5 along the optical axis 25, and corresponds to substantially the position of the center of gravity for the lens unit 5 including the weight of the lens holder 10 and the weight of the lens system 24 composed of the plurality of lenses 20. In the lens arrangement of the lens system 24 housed in the lens unit 5, the number of lenses in the second lens group 22 is the largest among the other lens groups 21 and 23 and the average diameter of the lenses in the second lens group 22 is larger than the average diameters of the lenses in the other lens groups 21 and 23. Accordingly, the weight of the second lens group 22 forms the main part of the weight of the lens unit 5 which is concentrated in the second shell 12. By constructing the lens unit 5 with supporting the weight of the second shell 12 using the support 60, the occurrence of warping and internal stress in the longitudinal direction along the optical axis 25 of the lens holder 10 can be reduced. Also, in the lens unit 5, warping or internal stress of the respective lenses 20 caused by supporting from the lens holder 10 can be suppressed.

The support 60 provided at substantially the center of the lens holder 10 in the longitudinal direction self supports the lens unit 5 independently and avoids deterioration in the optical performance of the lens unit 5 due to thermal expansion.

In projectors that project light, various changes have been made to the type of light source. Although LED and the like have been investigated in recent years, a loss occurs when converting electrical energy to light energy, resulting in the production of heat. Accordingly, when a projector starts to be used, the temperature normally becomes higher closer to the light source.

Since a cooling device such as a fan may be often provided in a projector, the temperature at the part (the part near the cooling device) cooled by the cooling device falls. However, this does not stop the temperature close to a light source from being susceptible to rising. In the lens unit 5, the temperature tends to rise for the third lens group 23 that is close to the light source, that is, the image generating apparatus 50, and the third shell 13 that houses the third lens group 23, and such parts are susceptible to thermal expansion during use.

Accordingly, when a lens unit is supported with the image generating apparatus 50 as a reference, the third shell 13 and incident-side part of the second shell 12 whose temperature is most likely to rise are most susceptible to thermal expansion. This means that the first shell 11, whose temperature is not susceptible to rising and has little thermal expansion, moves toward the screen and becomes displaced with respect to the screen. The respective lenses of the first lens group 21 have a large effect on focusing and therefore movement of such lenses with respect to the screen is likely to cause deterioration in the quality of the projected image. The effects of thermal expansion/contraction of the lens unit have cumulative effects even on parts that are fundamentally not susceptible to thermal expansion/contraction, resulting in deterioration in the optical performance.

In the lens unit 5, the optical path is internally bent by 90° so that expansion or contraction in the direction of the long axis (optical axis) 25 aligned with the light valve 4 has little effect on expansion or contraction in the direction of the short axis (optical axis) 26 aligned with the screen 9. Since the changes in the relevant distance between the first lens group 21 and the screen 9 can be kept small, the effect of temperature on the focusing performance of the lens unit 5 is small compared to a lens unit where all of the lens groups are disposed in a straight line.

In the lens system 24 where the optical path is bent by 90°, if the first lens group 21 moves significantly in the long axis 25 due to thermal expansion, the optical axis 26 that should be aligned with the screen 9 is shifted. As a result, there is the risk of deterioration in focusing performance, movement of the image on the screen, and the occurrence of color shift.

However, the lens unit 5 is supported by the support 60 in substantially the center of the long axis 25, with this point 60 being the origin for thermal expansion and contraction. According to the lens unit 5, displacement of the first lens group 21 and the second lens group 22, for which the temperature change is small, with respect to the screen can be kept small, which makes it easy to keep the image in focus and prevent images from shifting on the screen. Accordingly, it is possible to provide a lens unit with stable optical performance in response to temperature changes.

For this reason, the lens unit 5 can achieve a high optical performance even when using a material with a quite high coefficient of thermal expansion, that is, a resin material such as plastic, for the lens holder 10. In this lens unit 5, deterioration in the optical performance is prevented by adjusting the support point. So, the extra higher strength of the lens holder for reducing the deterioration is not required for this lens holder 10 and thereby reduces the cost. The lens holder 10 can be made thinner, complex support structures such as ribs can be reduced, and the overall construction can be simplified. By simplifying the construction of the lens holder 10, manufacturing can be simplified, tolerances can be reduced, and the effects of thermal expansion and contraction can be reduced, and therefore the fluctuations in the optical performance due to changes in temperature can be synergistically suppressed, which greatly contributes to the stabilization of image quality.

The lens unit 5 includes the support 60 that supports the lens unit 5 at a position away from the image generating apparatus 50, and therefore the lens unit 5 can be developed and designed separately from the image generating apparatus 50. That is, when a construction where the lens unit is attached to and supported by the image generating apparatus is used, the lens unit will be designed as an additional part for the image generating apparatus and it will be difficult to achieve an optically best design.

Since the lens unit 5 includes the lens holder 10 that is independently supported, the lens holder 10 can be independently designed and manufactured with the principal object of supporting the respective lenses. The lens system 24 can also be considered separately to the lens unit 5, which increases design freedom and facilitates the provision of a system with high aberration-correcting performance.

As a further step, it is possible to design a projector that is centered on the lens unit 5. For example, it is possible to use a design where the image generating apparatus 50 or at least the light valve 4 is supported by the lens unit 5, and also possible to use a design where devices are incorporated on the image generating side to counter thermal expansion and contraction.

Increased screen sizes are desired for projectors and in particular for rear projectors, and there is a tendency for the source of the images to be miniaturized. The distance between the screen and the lens unit is also limited. Accordingly, it is difficult to miniaturize the lens unit compared to the source and conversely since sufficient optical performance to sharply magnify and project the projecting image of the source is required, a certain number of lenses and lens area tend to become necessary. For this reason, using a design that is centered on the lens unit 5 in terms of both optical and strength considerations will be effective when developing rear projectors with increasingly large screens.

It should be noted that supports 60 are provided at symmetrical positions on the clamshell-type second shell 12. Since these supports 60 are located at interchangeable positions that are symmetrical with respect to the lens unit 5. In this construction, both supports 60 may be attached to support platforms 70 or only one support 60 may be attached to a support platform 70.

The construction that supports the weight of the lens unit 5 can be divided and provided in front of and behind the lens unit 5. In view of the thermal expansion and contraction, a construction that fixes the lens unit 5 at a plurality of support points in front of and behind the lens unit 5 (in the direction of the optical axis) may cause internal stress within the lens unit 5. So, a construction where the main support point is fixed and the other support point(s) can slide is preferable.

As described above, the lens holder 10 includes the shell 12 that is assembled from a plurality of subunits, and the second shell 12 includes a substantially cylindrical outer shell 12a and front side and rear side portions 41 and 42 that extend from the inner surface 12b of the outer shell 12a toward the optical axis for respectively supporting at least one lens 20. When the lens 20 is attached to the shell 12, one of the front side portion 41 and the rear side portion 42 is harder to deform, while the other of portions is easier to deform. Accordingly, even if there are manufacturing tolerances for the lenses and the attachment position of the lenses 20 are shifted by such tolerances, by making one of the front and rear side portions 41 and 42 deform easily, the direction in which the lens 20 shifts can be restricted to the direction where there is little effect. Although a clamshell type holder where two subunits of the same shape are joined centered on an optical axis has been described as one example of this type of lens holder, it is also possible to join three or more subunits or to join together subunits of different shapes.

Although a rear projector, and a lens holder and a lens unit suited to such rear projector have been described, the lens holder and the lens unit are suited to all kinds of systems that project images. Also, the lens holder and lens unit are not limited to systems that project images and can be applied to optical apparatuses or optical systems that use lenses, such as a camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens holder for holding a lens system that includes a plurality of lenses, comprising two subunits of an identical shape that assemble at least part of the lens holder and are divided at a divide on a plane including an optical axis of the plurality of lenses, each subunit of the plurality of subunits includes a part of a substantially cylindrical outer shell and front side and rear side portions that extend outward from an inner surface of the outer shell continuously and circumferentially along the inner surface of each subunit toward the optical axis to support and engage a lens from in front and behind respectively, wherein one of the front side and rear side portions of each subunit is harder to deform than the other of the front side and rear side portions of each subunit when the lens is attached between the portions to set a position of the lens based on a surface of the portion that is harder to deform;

wherein the two subunits are configured to be separated at the divide to insert the lens between the portions of one of the two subunits from a direction perpendicular to the optical axis, the two subunits configured to be joined together at the divide to form at least part of the lens holder and around the lens being circumferentially supported about its entire periphery by the front side and rear side portions of each subunit.

2. The lens holder according to claim 1, wherein a distance between the portions is narrower than a thickness of a part of the at least one lens that engages with the portions, and the other of the portions deforms and engages with the at least one lens.

3. The lens holder according to claim 1, wherein the thicknesses of the portions are different.

4. The lens holder according to claim 1, wherein cross-sectional forms of the portions are different.

5. A lens unit comprising:

the lens holder according to claim 1; and a lens system held by the lens holder.

6. The lens unit according to claim 5, wherein the lens system is for projecting light from an image generating apparatus onto a screen, and the lens holder includes a support structure for supporting the weight of the lens unit at a position away from the image generating apparatus.

7. The lens unit according to claim 6, wherein the support structure supports the lens unit at or near a center of gravity of the lens unit.

8. The lens unit according to claim 6, wherein an optical path inside the lens holder is bent.

9. A displaying apparatus comprising:

the lens unit according to claim 5;

a screen; and an image generating apparatus that forms an image to be projected via the lens unit onto the screen.

10. A displaying apparatus comprising:

the lens unit according to claim 5; and an image generating apparatus that forms an image to be projected via the lens unit onto a screen.

* * * * *